United States Patent Office 3,161,687
Patented Dec. 15, 1964

3,161,687
PHOSPHINE OXIDE POLYMERS
Albert Y. Garner, Springfield, Mass., assignor to
Monsanto Company, a corporation of Delaware
No Drawing. Filed Sept. 6, 1960, Ser. No. 53,921
3 Claims. (Cl. 260—606.5)

This invention relates to novel phosphorous containing resins. More particularly, it relates to the synthesis of novel halophosphinite monomers from which novel polyphosphine oxide resins may be prepared. This application is a continuation in part of application S.N. 747,356, filed June 17, 1958, now abandoned.

The technology of phosphorous polymers has remained relatively undeveloped in the United States, the larger part of the art being developed in the U.S.S.R. However, with the present availability of phosphorous containing intermediates phosphorous polymers are growing increasingly attractive for use in specialized applications wherein their novel properties can be advantageously utilized. In a copending application, Serial No. 742,474, filed June 17, 1958, now abandoned, polyphosphinate resins derived from novel halophosphonite monomers are disclosed.

It is an object of this invention to provide novel phosphorous compounds.

Another object is the provision of novel halophosphinite compounds.

Another object is the provision of novel phosphorous containing monomers and a process for their manufacture.

A further object is the provision of novel phosphorous containing polymers and a process for their manufacture.

These and other objects are attained by reacting a halophosphine with a monohydric alcohol or phenol at a temperature below about 20° C. to form a halophosphinite monomer corresponding to the general formula:

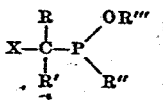

and subsequently heating the halophosphinite monomer at a temperature above the activation temperature of the halogen groups thereof to form a polyphosphine oxide resin comprised of a plurality of monomeric units corresponding to the general formula:

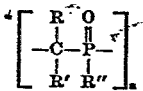

The entire sequence of steps is performed in a substantially oxygen-free atmosphere. In each of the above formulae X is either bromine or chlorine, R and R' may be, independently, either hydrogen or hydrocarbon radicals, R" and R'" are hydrocarbon radicals containing from 1–10 carbon atoms and $n$ is an integer of from 10 to 10,000.

The following examples are given in illustration of the invention and are not intended as limitations thereof.

Example I

Preparation of chloro-chloromethyl-methylphosphine: An etheral solution of 0.5 mol of diazomethane was added slowly over a period of five hours with constant stirring to an etheral solution of about 0.5 mol of methyldichlorophosphine while maintaining a reaction temperature of about —55±5° C. The resulting mixture is allowed to warm to about room temperature, whereupon the ether is removed by distillation. The residue is vacuum distilled to yield a colorless fluid boiling at about 63° C. at 130 mm. of mercruy pressure and having an index of refraction at 25° C. of about 1.493. The fluid is identified as chloro-chloromethyl-methylphosphine.

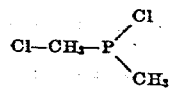

Example II

About 1 mol of anhydrous methanol and 0.5 mol of pyridine are placed in a closed reaction vessel under a nitrogen atmosphere. The contents of the reaction vessel are cooled, e.g., in an ice bath, to about 0° C. About 0.1 mol of the chloro-chloromethyl-methylphosphine prepared in Example I is added slowly and with constant stirring while maintaining the reaction system at about 0 to 10° C. After all of the chloro-chloromethyl-methylphosphine has been added the product is recovered by vacuum distillation in a nitrogen atmosphere. The product is chloromethyl-methyl-methylphosphinite.

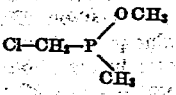

The yield is about 55% based upon the chloro-chloromethyl-methylphosphine.

Example III

The chloromethyl-methyl-methylphosphinite monomer prepared in Example II is heated in a nitrogen atmosphere at a temperature of about 150° C. for about 3 hours. The reaction product contains polymer dissolved in residual monomer. A white, solid polymer is precipitated by pouring the reaction product into an excess of methanol. A low molecular weight liquid polymer is also recovered from the methanol solution by evaporation of the lower boiling solvents. Both the solid and the liquid polymers are identified by infra-red spectroscopy as being poly-(methyl-methylene-phosphine oxide).

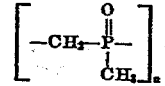

Similar results are obtained by substituting alpha-chlorotoluyl-chloro-phenylphosphine (B.P. of about 110° C. at 0.3 mm. and $n_d$ at 25° C. of about 1.64, prepared by reacting phenyldiazomethane with phenyldichlorophosphine in the manner of Example I) and phenol, respectively, for the chloro-chloromethyl-methylphosphine and methanol employed in Example II and polymerizing the reaction product thereof as in Example III.

The halophosphines employed in preparing the monomers of this invention correspond to the general formula:

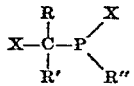

wherein X is either bromine or chlorine, R and R' may be, independently, either hydrogen or hydrocarbon radicals and R" is a hydrocarbon radical containing from 1—

10 carbon atoms. The compounds may be prepared by the method reported by Yakubovich, Ginsburg and Makarov in Doklady Akad. Nauk., S.S.S.R., vol. 71, page 303 (1950), and by Yakubovich and Ginsburg in Jour. General Chemistry, U.S.S.R., vol. 22, page 1534 (1952). In this method equimolar proportions of a dihalophosphine, corresponding to the general formula:

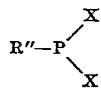

and a diazoalkane of the species

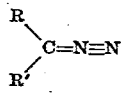

are reacted in an ethereal solution at temperatures of from −80 to −40° C. in a substantially oxygen-free inert atmosphere. Examples of halophosphines preparable by this method and suitable for use in this invention include chloro-chloromethyl-phenylphosphine, alpha-bromoethyl-bromo-ethylphosphine, 2-chloroisopropyl - butyl-chlorophosphine, alpha-chlorotoluyl-benzyl-chlorophosphine, alpha-chlorodiphenylmethyl-chloro-methylphosphine, etc.

The mono-hydric alcohols and phenols used in preparing the monomers of this invention correspond to the general formula:

wherein R‴ is a hydrocarbon radical containing from 1–10 carbon atoms. Among the suitable alcohols may be mentioned methanol, ethanol, isobutanol, tertiary butanol, hexanol, etc. Suitable phenols include phenol, meta-cresol, 3-methyl-2-isopropyl-phenol, etc.

The halophosphinite monomers of this invention are prepared by reacting one molar proportion of the halophosphine with at least one molar proportion of the alcohol or phenol at a temperature below about 20° C., preferably in the range of from −40 to 20° C. Although not necessary, it is preferred to carry out the reaction in the presence of a tertiary base as an acceptor for the hydrogen halide formed. If the tertiary base is omitted, an excess of the alcoholic or phenolic component should be used. Examples of suitable tertiary bases include pyridine, N,N-dimethylaniline, etc. The reaction is carried out in an oxygen-free atmosphere obtained, e.g., purging the reaction vessel with an inert gas such as nitrogen, etc.

The halophosphinite monomers prepared according to the teachings of this invention are high boiling liquids corresponding to the general formula:

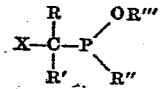

wherein X, R, R′, R″ and R‴ are radicals as previously described. These monomers are recovered from the final reaction mixture according to conventional low temperature techniques. If a tertiary base is employed, the amine salt thereof, formed during the reaction, is insoluble and may be filtered from the reaction mixture. The excess alcohol or phenol is removed under vacuum using temperatures below the halogen activation temperature of the halophosphinite monomer. Monomer recovery is carried out preferably in an oxygen-free, e.g., nitrogen, atmosphere.

The halophosphinite monomers of this invention may be polymerized by heating at a temperature above the activation temperature of the halogen atoms thereof in an oxygen-free atmosphere. For rapid reaction to high yields, temperatures of from about 75–250° C. are preferred. The polymers are later recovered according to conventional techniques such as precipitation from an excess of a non-solvent, evaporation of the solvents, etc.

The phosphine oxide polymers obtained are comprised of a plurality of monomeric units corresponding to the general formula:

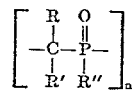

wherein R and R′ may be, independently, either hydrogen or hydrocarbon radicals and R″ is a hydrocarbon radical containing from 1–10 carbon atoms. The degree of polymerization, $n$, of these polymers is from about 10 to 10,000. These polyphosphine oxides are characterized by their outstanding thermal stability, even at temperatures in excess of 400 °C. as well as their stability to oxidation and hydrolysis. The lower molecular weight polymers are fluids at room temperature whereas those of the higher molecular weight melt at temperatures above 100° C. Therefore, these resins are useful as heat exchange fluids, especially at high temperatures. Furthermore, they may be used as molding powders, textile sizing, etc. Another important use is as laminating adhesives for wood, glass, metal, etc.

*Example IV*

About 15 grams of the monomer of Example II are heated in a nitrogen atmosphere at 100° C. until viscous. The viscous polymer is poured evenly onto a clean glass plate and a second clean glass plate is placed on top. This sandwich is placed in a press under about 50 p.s.i. pressure and is heated at 200° C. for about one hour to complete the polymerization in situ. The resulting glass laminate is resistant to common solvents and remains intact even after a 10 minutes immersion in boiling water.

These polyphosphine oxides may be used per se or they may be modified by the incorporation of conventional additives such as plasticizers, dyes, pigments, etc. They may also be used in combination with other resins, e.g., alkyds, vinyl, diene polymers, etc.

It is obvious that many variations may be made in the products and processes of this invention without departing from the spirit and scope thereof.

What is claimed is:

1. As compositions of matter, phosphine oxide polymers of the general formula:

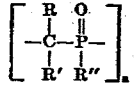

wherein R and R′ are radicals independently selected from the group consisting of hydrogen and saturated hydrocarbon radicals, R″ is a saturated hydrocarbon radical containing from 1–10 carbon atoms and $n$ is an integer of from 10 to 10,000.

2. As a composition of matter, poly-(methyl-methylenephosphine oxide) which is of the structure

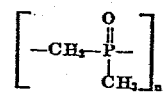

wherein $n$ is an integer of from 10 to 10,000.

3. A process for preparing phosphine oxide polymers of the general formula:

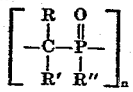

which comprises heating a halophosphinite monomer in an oxygen-free atmosphere at a temperature above the activation temperature of the halogen groups thereof; said halophosphinite monomer corresponding to the general formula:

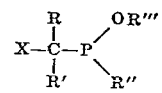

wherein, in the above formulae, X is a halogen selected from the group consisting of bromine and chlorine, R and R' are radicals independently selected from the group consisting of hydrogen and saturated hydrocarbon radicals, R'' and R''' are saturated hydrocarbon radicals containing from 1–10 carbon atoms and $n$ is an integer of from 10 to 10,000.

References Cited by the Examiner

UNITED STATES PATENTS 2,274,291  2/42  Clayton et al. _____ 260—461
2,573,568  10/51  Harman et al. _____ 260—461
2,860,155  11/58  Walsh _____ 260—461

OTHER REFERENCES

Yakubovich et al.: Chemical Abstracts, vol. 47, pages 9254–9258 (1953).

MURRAY TILLMAN, *Primary Examiner*.

MILTON STERMAN, LOUISE P. QUAST, *Examiners*.